United States Patent
McBeth

(10) Patent No.: US 9,956,932 B2
(45) Date of Patent: May 1, 2018

(54) INDUCTION CHARGE TRANSFER SYSTEM AND METHOD FOR NEUTRALIZING ELECTROSTATIC CHARGE GENERATION

(71) Applicant: The United States of America as represented by the Secretary of the Navy, Washington, DC (US)

(72) Inventor: Michael S. McBeth, Williamsburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 68 days.

(21) Appl. No.: 15/251,519

(22) Filed: Aug. 30, 2016

(65) Prior Publication Data

US 2018/0056904 A1    Mar. 1, 2018

(51) Int. Cl.
*H02J 7/00* (2006.01)
*B60R 16/06* (2006.01)
*H01M 10/44* (2006.01)
*H05K 9/00* (2006.01)

(52) U.S. Cl.
CPC .............. *B60R 16/06* (2013.01); *H01M 10/44* (2013.01); *H02J 7/0052* (2013.01); *H05K 9/0007* (2013.01)

(58) Field of Classification Search
CPC ....... Y02E 60/12; H02J 7/0042; H02J 7/0045; H01M 10/46; H01M 10/44
USPC ........................................................ 320/107
See application file for complete search history.

(56) References Cited

U.S. PATENT DOCUMENTS

| | | | | |
|---|---|---|---|---|
| 4,736,906 A | * | 4/1988 | Taillet | B64D 45/02 244/1 A |
| 5,587,587 A | * | 12/1996 | Hashimoto | H01J 37/026 250/251 |
| 6,873,516 B1 | * | 3/2005 | Epstein | H05F 3/02 361/212 |
| 2003/0071628 A1 | * | 4/2003 | Zank | G01D 9/005 324/457 |
| 2014/0085095 A1 | * | 3/2014 | Kalokitis | G01R 31/02 340/657 |
| 2015/0090114 A1 | * | 4/2015 | Au | B03C 3/34 95/8 |

* cited by examiner

*Primary Examiner* — Arun Williams
(74) *Attorney, Agent, or Firm* — SPAWAR Systems Center Atlantic; Kyle Eppele; Susanna J. Torke

(57) ABSTRACT

A method for neutralizing electrostatic charge comprising the steps of placing a first conductive body in contact with a second conductive body, wherein the first conductive body is proximate to a charged object; inducing a positive charge on the first conductive body and an equal amount of negative charge on the second conductive body; electrically isolating the first and second conductive bodies; connecting the first conductive body to the negatively charged object long enough to neutralize excess positive charge; placing the second conductive body in contact with an electrical receiver; transferring excess charge into the electrical receiver; discharging and isolating the conductive bodies; and bringing the conductive bodies back into contact with each other.

20 Claims, 8 Drawing Sheets

INDUCTION CHARGE TRANSFER SYSTEM AND METHOD FOR NEUTRALIZING ELECTROSTATIC CHARGE GENERATION

FEDERALLY-SPONSORED RESEARCH AND DEVELOPMENT

Induction Charge Transfer System and Method for Neutralizing Electrostatic Charge Generation is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 103869.

BACKGROUND

The system and method described herein show how to neutralize and eliminate electrostatic charge accumulation on metal structures, particularly on helicopter airframes, where the engines and spinning rotor blades generate electrostatic charges that present an electrical shock hazard to personnel.

BRIEF DESCRIPTION OF THE DRAWINGS

FIG. 3d' illustrates an embodiment of a method for neutralizing helicopter electrostatic charging in accordance with Induction Charge Transfer System and Method to Neutralize Helicopter Electrostatic Charging with a positively charged airframe.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment," "in some embodiments," and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Described herein is a self-contained induction charge transfer system and method for neutralizing helicopter electrostatic charging. This system and method would be used in place of a grounding tether or actively driving currents off the airframe in order to neutralize electrostatic charge.

Figure 1:
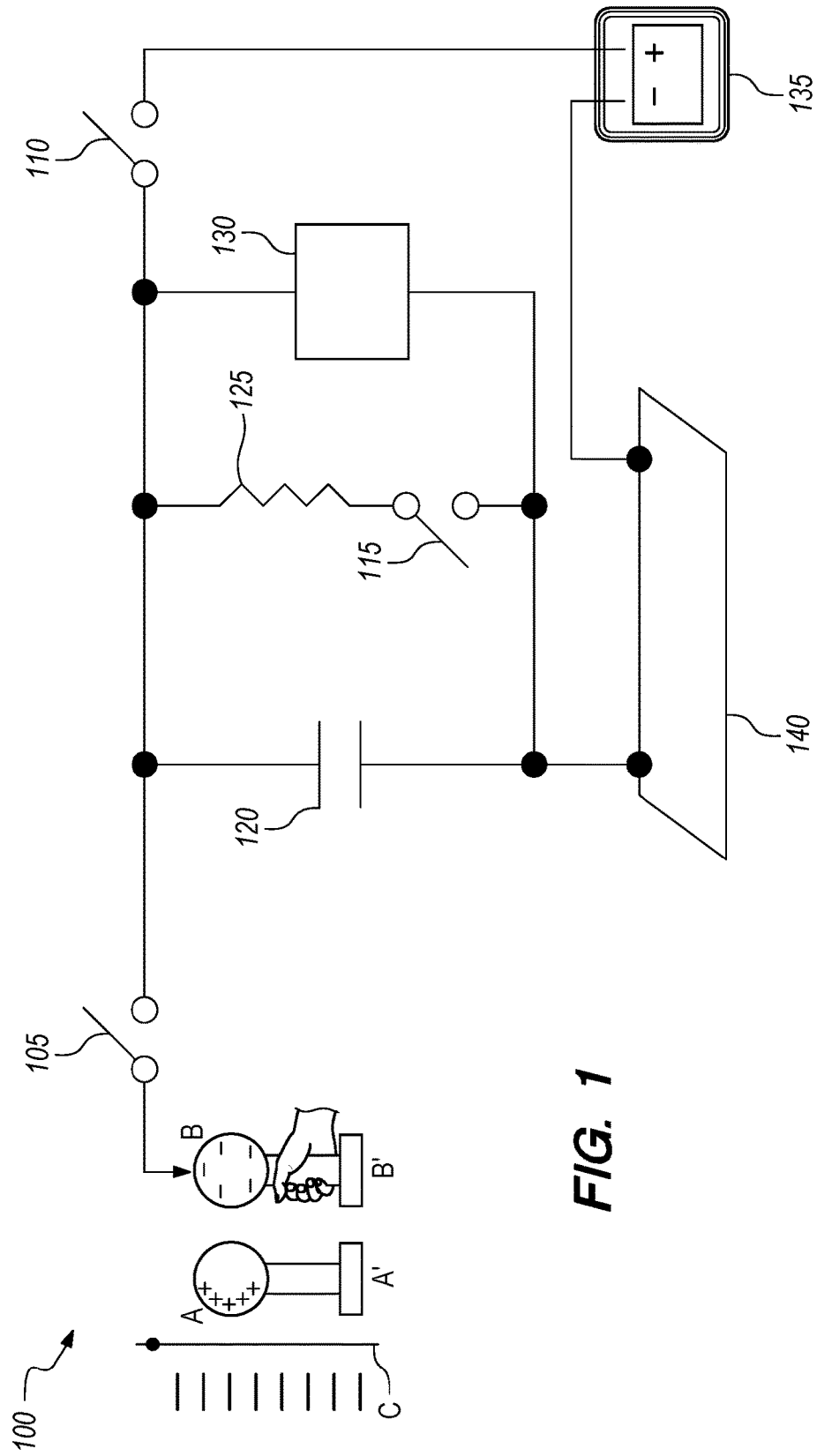
FIG. 1 illustrates an embodiment of a system that may be used to implement a method in accordance with the Induction Charge Transfer System and Method for Neutralizing Electrostatic Charge Generation.

FIG. 1 illustrates an embodiment of a system 100 which implements a method in accordance with the Induction Charge Transfer System and Method for Neutralizing Electrostatic Charge Generation neutralizing helicopter electrostatic charging. During helicopter flight operations, there will be a charging current that will accumulate charge on the airframe due to the rotating helicopter blades. System 100 is shown as having a negatively charged helicopter airframe C. In practice, either charge polarity may be generated depending on the aircraft and operating environment. System 100 has a resistor-capacitor (RC) circuit comprising a first and second conducting body, hereinafter described as a first hollow metallic sphere A and a second hollow metallic sphere B on insulated stands A' and B'. Spheres A and B and stands A' and B' are placed adjacent to a negatively charged helicopter airframe C to create a dipole wherein positive charge is induced on first sphere A and an equal amount of negative charge is induced on second sphere B. Sphere A is proximate to airframe C. System 100 further comprises switches 105, 110, and 115, a capacitor 120 disposed in parallel to a resistor 125, coupled to a voltmeter 130, a rechargeable power source 135, and a reference ground plane 140. System 100 may also further comprise a fourth switch 155 and an integrating ammeter, 160, not visible in FIG. 1.

Figure 2:
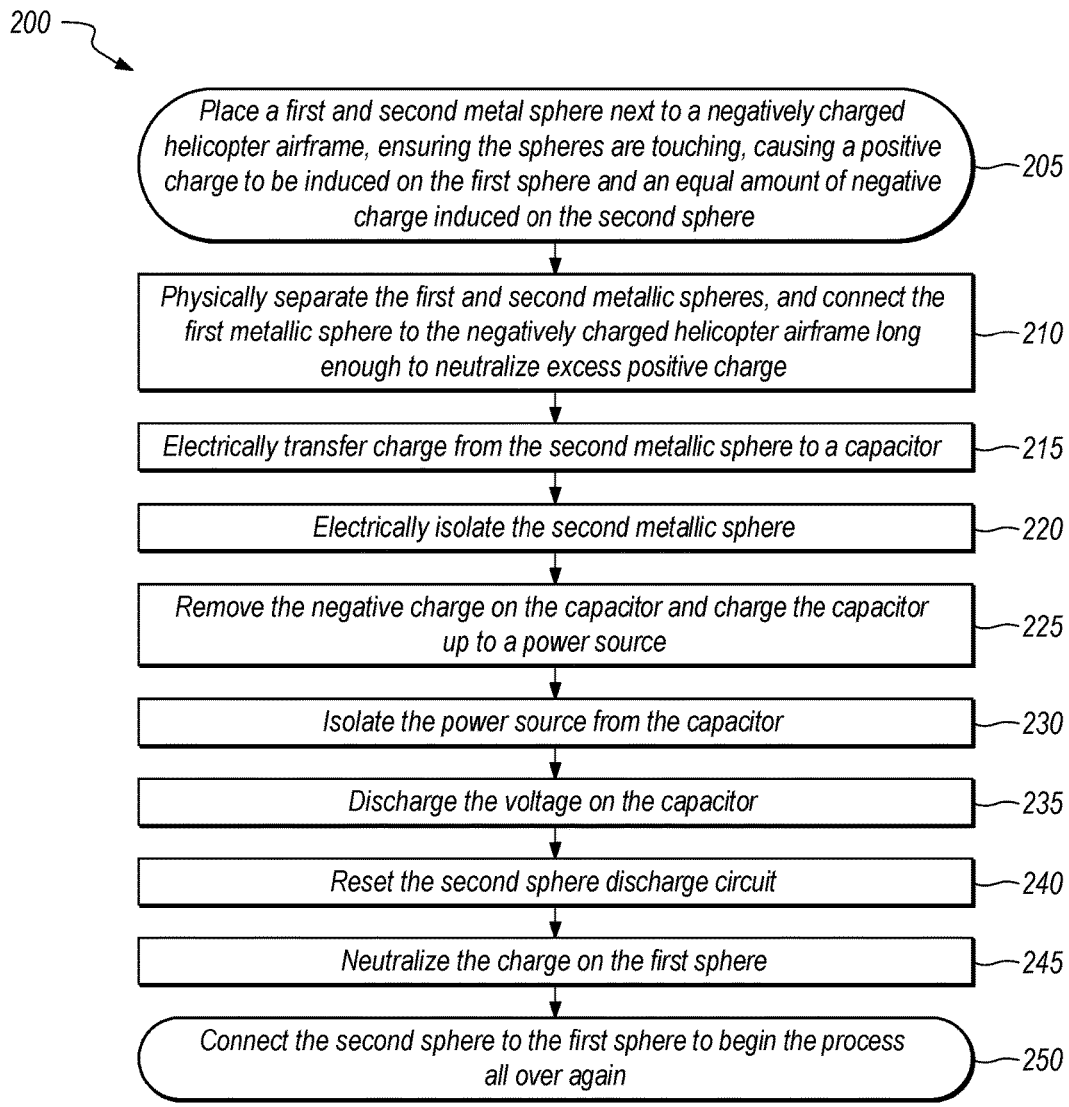
FIG. 2 shows an embodiment of a method in accordance with the Induction Charge Transfer System and Method for Neutralizing Electrostatic Charge Generation.

FIG. 2 shows an embodiment of a method 200 in accordance with the Induction Charge Transfer System and Method for Neutralizing Electrostatic Charge Generation. For illustrative purposes, method 200 will be discussed with reference to the Induction Charge Transfer System and Method for Neutralizing Electrostatic Charge Generation. In step 205, method 200 is initiated when a first hollow metallic sphere A, sitting on top of an insulated stand A', is placed next to a negatively charged helicopter airframe C. A second hollow metallic sphere B, sitting on top of an insulated stand B', is place on the other side of sphere A. Sphere A on top of stand A' is touching sphere B on top of stand B.' Also in step 205, a positive charge is induced on first sphere A and an equal amount of negative charge is induced on second sphere B, which happens automatically due to the helicopter rotor motion inducing a negative charge on the airframe. In step 210, sphere A and sphere B are separated, and one of the spheres (sphere A) is connected to helicopter airframe long enough to neutralize any excess positive charge. For step 215, charge is electrically transferred from the second metallic sphere to a capacitor 120. For step 220, the second metallic sphere is electrically isolated. For step 225, the negative charge is removed from the capacitor and the capacitor is charged up to a power source. For step 230, the power source is isolated from the capacitor. For step 235, the voltage on the capacitor is discharged. For step 240, the second sphere discharge circuit is reset. For step 245, the charge is neutralized on the first sphere. For step 250, the second sphere and first sphere are connected to begin the process all over again.

Figure 3A:
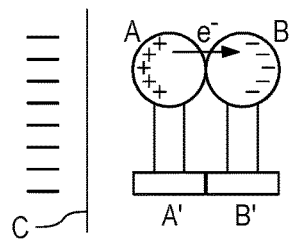
FIGS. 3a-3j illustrate an embodiment of a method for neutralizing helicopter electrostatic charging in accordance with Induction Charge Transfer System and Method to Neutralize Helicopter Electrostatic Charging with a negatively charged airframe.

FIG. 3a illustrates step 1 of method 200 wherein first sphere A and second sphere B on insulated stands A' and B' respectively are placed next to a negatively charged airframe C. Spheres A and B are touching.

Figure 3B:
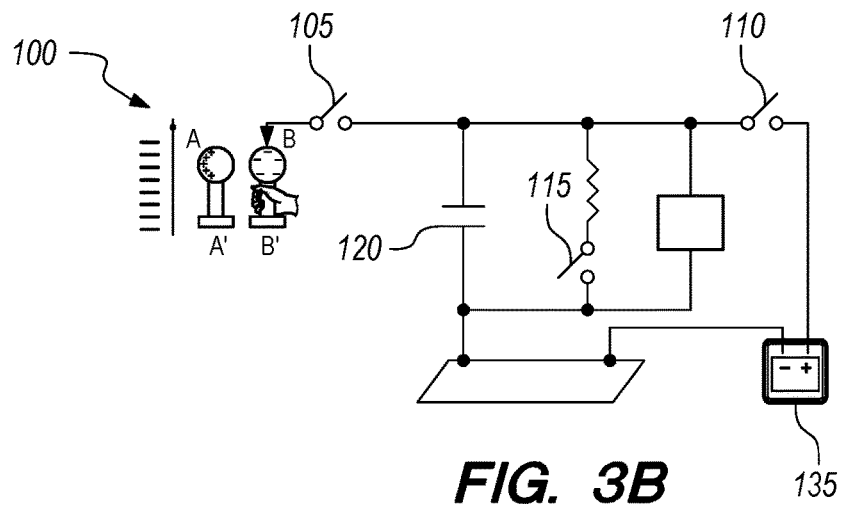

FIG. 3b shows Step 2 of method 100 where sphere B and insulated stand B' have been separated from sphere A and insulated stand A' and moved into position to make electrical contact with switch 105. Also in this step, sphere A is coupled with the negatively charged airframe C long enough to neutralize excess positive charge. Switch 105, switch 110, and switch 115 are open. In another embodiment, an electroscope or electrometer can be used to measure the charge on sphere B in FIG. 3b and then use electrical power source 135 to charge up capacitor 120 to a voltage to supply exactly the amount of charge required to neutralize the charge on sphere B.

Figure 3C:
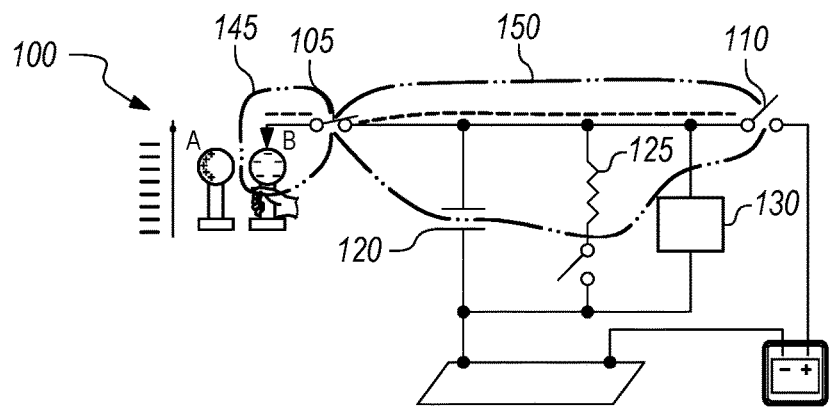

FIG. 3c shows step 3 where switch 105 has been closed and that charge is transferred from sphere B to capacitor 120. This electrically connects a conducting surface area $A_{spb}$ 145 comprising sphere B plus the conducting surface through one half of switch 105 with a conducting surface area $A_{cx}$ 150 of electrical connections between one half of capacitor 120, resistor 125, voltmeter 130, and up to one half of switch 110. Since the electrical charge on sphere B will distribute itself uniformly over the combined electrical conducting surface areas $A_{spb}$ 145+$A_{cx}$ 150, if surface area $A_{cx}$ 150 is 100 times larger than the surface area $A_{spb}$ 145, then $1/100^{th}$ of the charge will remain on sphere B and the other 99/100 parts of the charge will be on the same surface area $A_{cx}$ 150 associated with discharge capacitor 120.

Figure 3D:
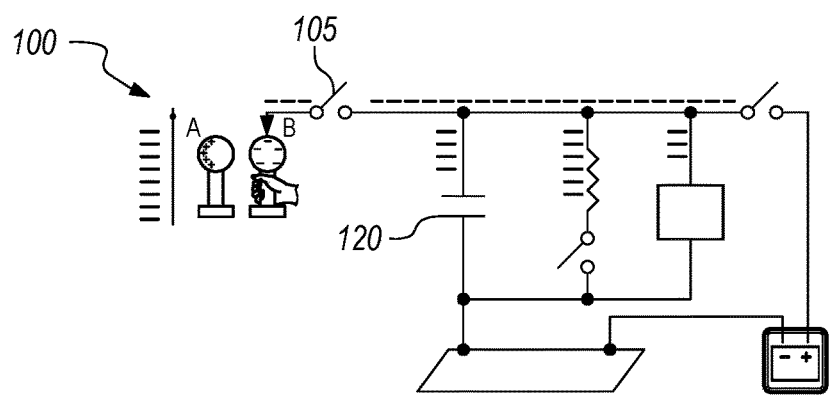

FIG. 3d is step 4, showing switch 105 being opened to isolate sphere B and measuring voltage on capacitor 120 to estimate the charge originally induced on sphere B:

$$Q_{sb} \approx V_{c1} \times C1 \qquad [\text{Eq 1}]$$

Wherein $Q_{sb}$ is the charge on sphere B, $V_{c1}$ is voltage and C1 is capacitance of capacitor 120. At this point 99/100 parts of the charge have been removed from sphere B and effectively placed on capacitor 120. An estimate of the charge originally induced on sphere B is equal and opposite to the charge induced on sphere A.

Figure 3E:
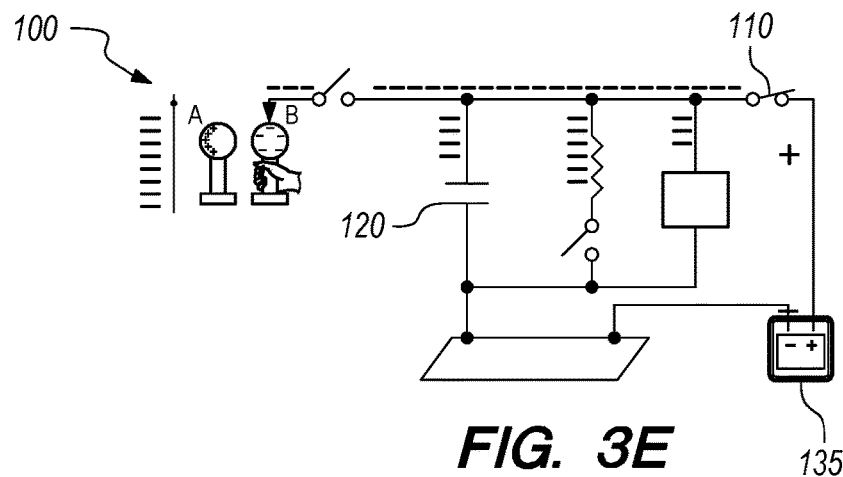

FIG. 3e shows step 5 of method 200, where switch 110 is closed to remove the negative charge on capacitor 120 and capacitor 120 is charged up to power source voltage $V_{sb}$. Here, the negative charge on capacitor 120 is removed by driving a positive current i from power source 135 onto capacitor 120. Capacitor 120 is already partially charged up to the power source voltage $V_{sb}$, so the amount of current i required to flow from power source 135 is more than it would be if the induced charge on sphere B were positive rather than negative. This current i flows until capacitor 120 is charged up to the power source potential, $V_{sb}$.

Figure 3F:
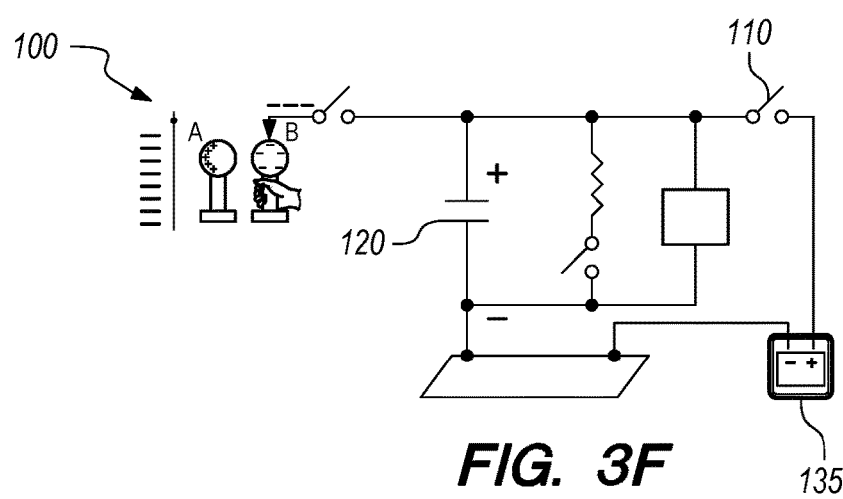

FIG. 3f shows step 6 of method 200 where switch 110 is opened to isolate power source 135 from capacitor 120.

Figure 3G:
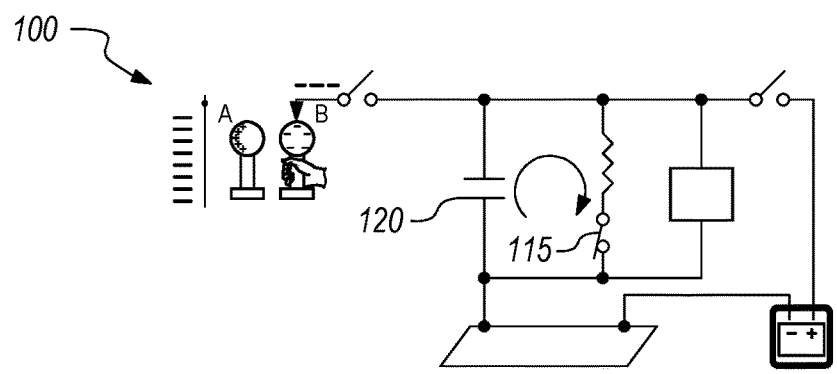
Figure 3E:
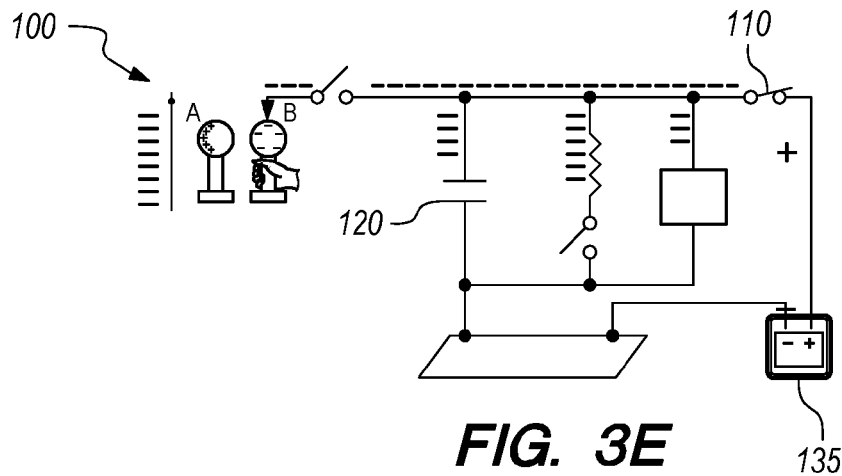
Figure 3F:
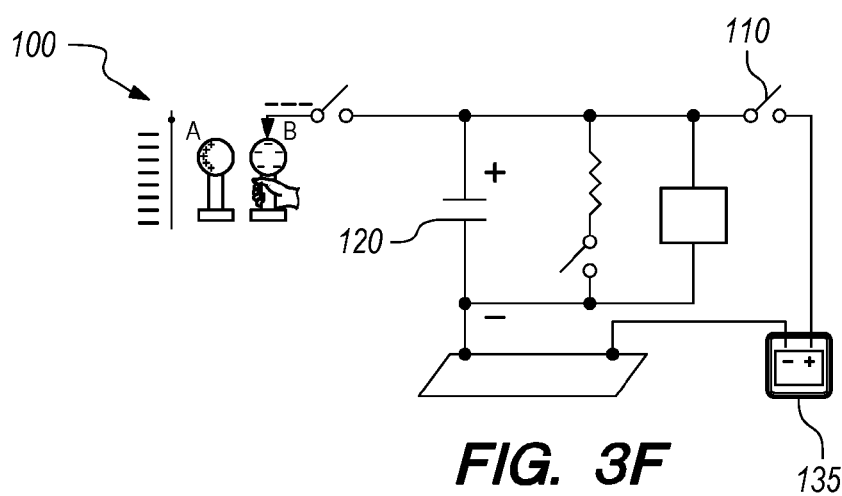
Figure 3G:
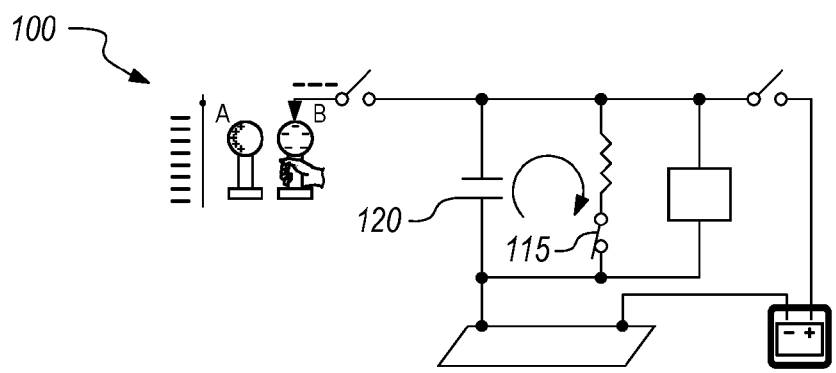

FIG. 3g shows step 7 where switch 115 is closed to discharge the voltage on capacitor 120. In this step, the charge is drained off of capacitor 120 to prepare to reset the sphere B discharge circuit.

Figure 3H:
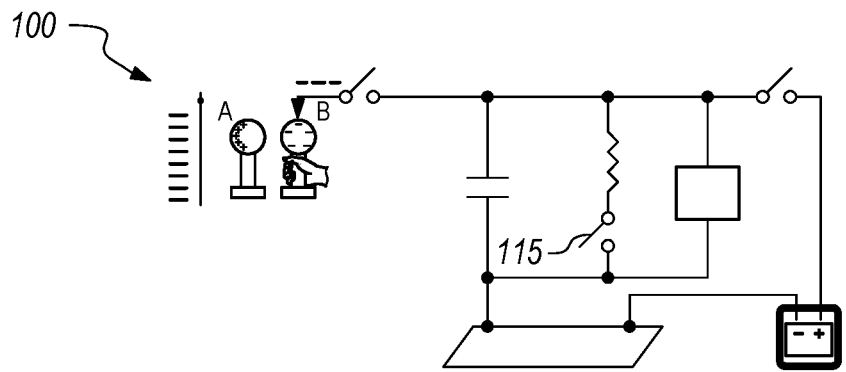

FIG. 3h shows step 8 where switch 115 is opened to reset the sphere B discharge circuit. At this point, if there is remaining charge system 100 could switch back to FIG. 3b step 2 to remove another 99/100 parts of the remaining charge on sphere B, or the system could move forward to FIG. 3i step 9.

Figure 3I:
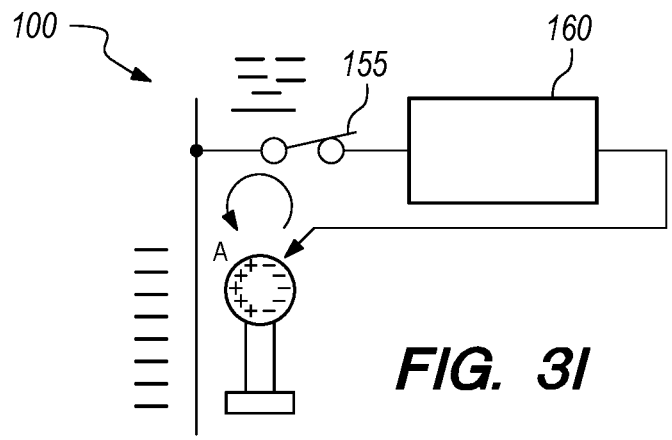

FIG. 3i shows step 9 of method 200, where the charge is neutralized on sphere A. Fourth switch 155 should be closed only long enough to transfer $Q_{sb}$ coulombs of charge measured in FIG. 3c at step 3. This transfer of charge is accomplished by using integrating ammeter 160 designed for this purpose.

Figure 3J:
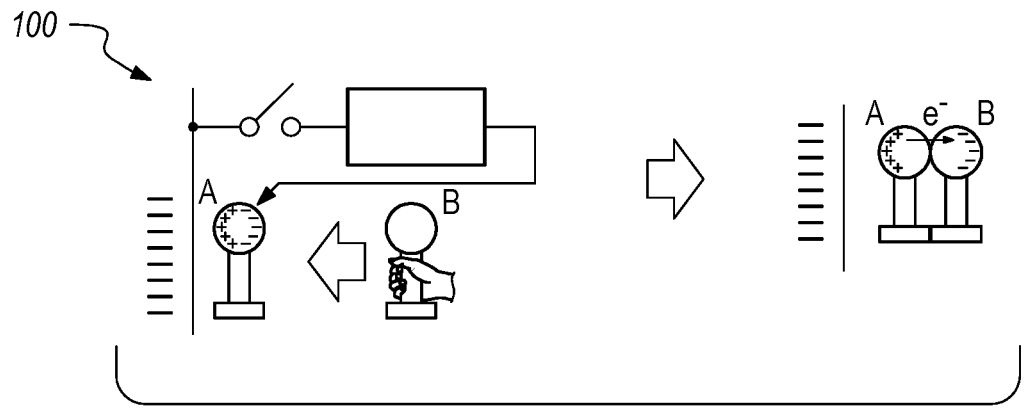

FIG. 3j shows step 10 of method 200, where sphere B moves to make contact with sphere A, at which point the whole process can start over from the beginning.

This method assumes the charge induced on sphere B at the outset is positive rather than negative. If the induced charge is positive, by FIG. 3d step 4 capacitor 120 is already partially charged up to the power source voltage, so the amount of current i that needs to flow from power source 135 is less than in the negative charge case. Step 4 with an initial positively charged airframe is illustrated in FIG. 3d'.

In other alternative embodiments, while the principles of physics behind the concept can be illustrated and understood by moving metallic spheres back and forth and using metal rods to make and break electrical connections, another embodiment of this invention requires no moving parts and is realized by using wide band gap devices such as Silicon Carbide MOSFET switches to make and break connections within the induction charge transfer and neutralization system. These switches have low resistance, can withstand tens of kilovolts of potential, and can operate at speeds up to 100 kHz.

Figure 4:
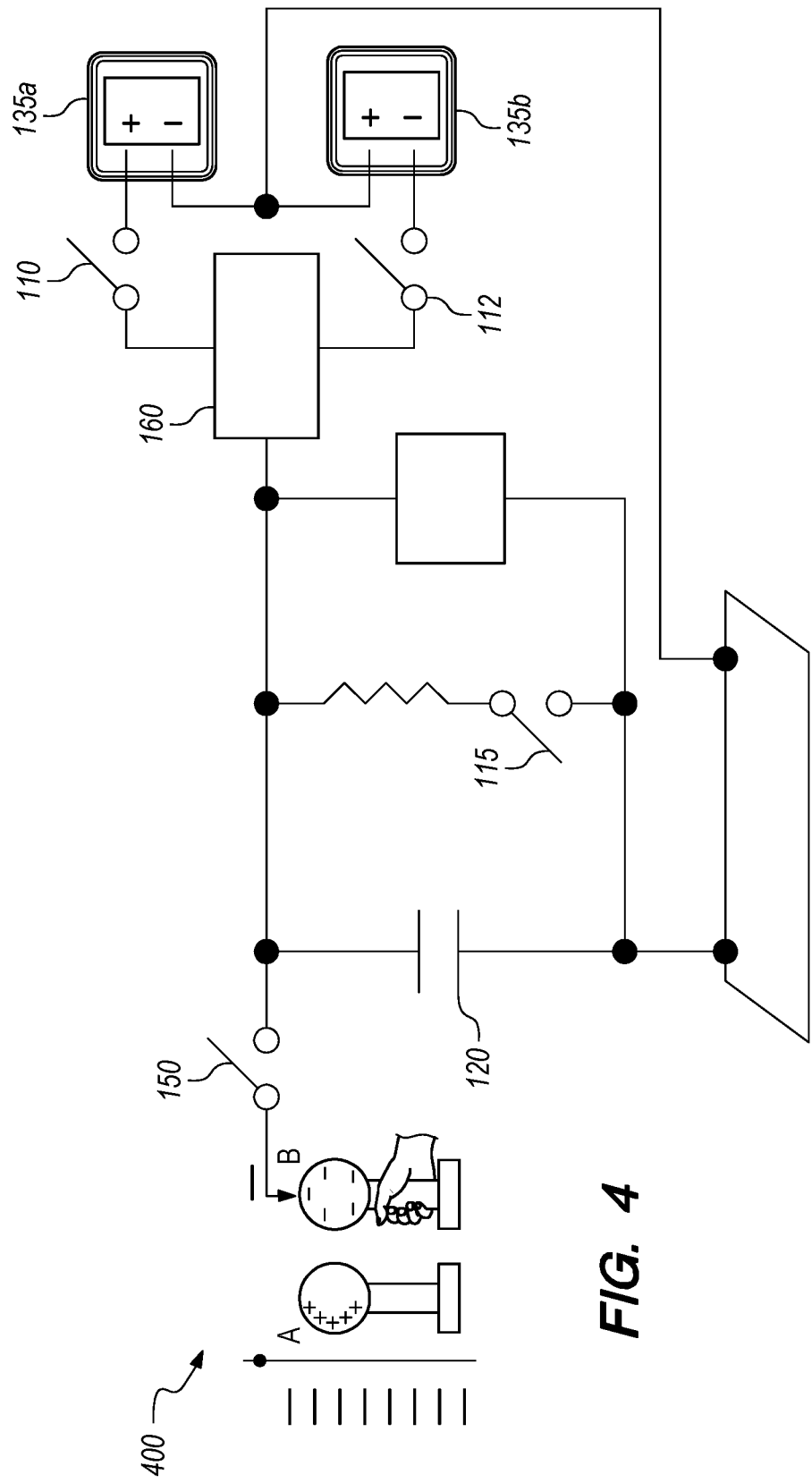
FIG. 4 shows an embodiment of a system having two power sources that may be used to implement the method in accordance with Induction Charge Transfer to Neutralize Helicopter Electrostatic Charging.

FIG. 4 shows an alternative Dual Battery Polarity Induction Charge Transfer system 400 wherein the helicopter airframe has a net negative charge. The single power source polarity method is less efficient in that it requires a capacitor to be charged to the power source voltage for each induction charge transfer cycle and then dumped through a resistor, which wastes energy, although the circuit will neutralize the electrostatic charge generation. The alternative dual battery polarity induction charge transfer system 400 eliminates much of this inefficiency by only transferring the exact amount of opposite charge on capacitor 120 to bring the voltage to zero.

FIG. 4 illustrates system 400, where either the positive terminal on a first battery 135a is connected to capacitor 120 through switch 110 and integrating ammeter 160, or the negative terminal on a second battery 135b is connected to capacitor 120 through switch 115 and integrating ammeter 160. This dual battery polarity induction charge transfer system 400 will efficiently neutralize electrostatically generated charges on metallic structures including helicopter airframes.

Figure 5:
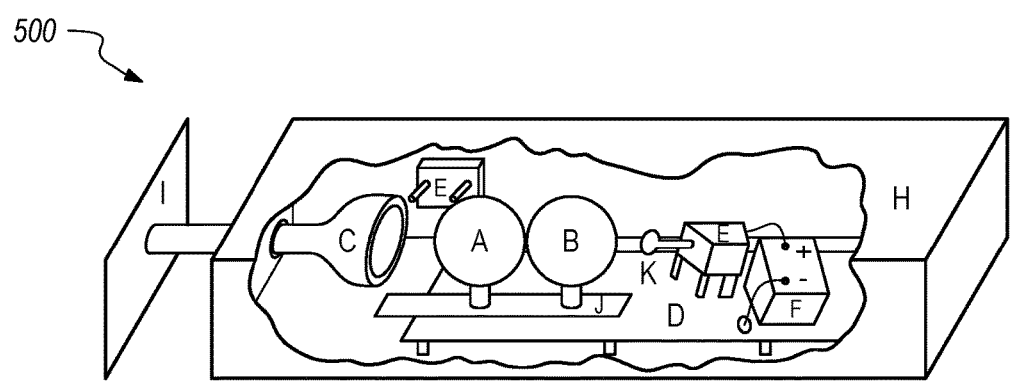
FIG. 5 shows a side view of a self-contained induction charge transfer system enclosed in a Faraday cage enclosure.

FIG. 5 shows an embodiment of an induction charge transfer system 500 with a Faraday Cage, H, cut away to show the internal components of the system 500. This embodiment operates with physically moving metal spheres using the repeating steps in 3a-3j. The self-contained induction charge transfer system is housed in Faraday shield enclosure, H, to allow for an isolated reference ground plane, D, and control circuitry E and G. A hemispherical charging cup, C, is electrically connected to the helicopter airframe, I, through an insulated penetration in the Faraday shield, H. The hemispherical charging cup C is positioned to induce charges on the metallic dipole sphere combination A and B, which move back and forth on a track J. Metal spheres A and B are positioned in FIG. 2 to match step two in FIG. 3b.

For induction charging, metal spheres A and B are in direct contact with each other and positioned along track J, so that the left side of sphere A is within the hemispherical charging cup, C. Once the charge on airframe I induces the opposite charge on sphere A, and sphere B has a charge with the same polarity as airframe I, charge separation is accomplished by moving metal sphere B to the right on track J. This breaks electrical connection between metal spheres A and B. For charge transfer, metal sphere B continues moving on track J until it makes contact with the metal conductor K protruding from battery charge/discharge electronics module, E. At this point, the battery charge/discharge electronics module E transfers electrical charge to or from rechargeable battery, F, to neutralize the induced charge on metal sphere A. Then charge neutralization electronics module G retracts breaking the electrical contacts with hemispherical charging cup C and metal sphere A. Once metal spheres A and B have their induced electrical charges neutralized, this results in discharged spheres. Lastly, metal sphere B is moved to the left along track J to make contact with metal sphere A to being the induction charge transfer process again.

Another embodiment of this method uses metallic spheres, each separated by a non-conducting sphere, in a pneumatic tube that moves in a continuous loop so that spheres would be continually inducing charge onto them as they make contact with sphere A and at the other end of the loop discharging when they make contact with the sphere B discharging circuit. The method could also incorporate two sphere B discharging circuits in series so that the residual charge could be removed as the conducting spheres make their way around the loop. This embodiment could probably be made to run faster and be more reliable than just moving sphere B back and forth on slides or a similar embodiment.

Another embodiment would be to use sections of conducting liquid separated by insulating liquid segments in a continuous loop similar to the conducting spheres in a loop embodiment described in the paragraph above.

The system described herein can be made using moving parts such as metal spheres to induce electrical charges from a conducting structure whose electrostatic charge needs to be neutralized to complete the five step process shown in FIG. 1.

The system can be made using high band gap semiconductors such as Silicon Carbide Middle Oxide Semiconductor Field Effect Transistor (MOSFET) switches to make and break the electrical connections without using moving parts to neutralize the electrostatic charge on a conducting structure. In addition to the aviation application to neutralize the electrostatic charge generation on helicopters, the invention could be used in industrial applications where electrostatic charges need to be neutralized from conducting structures.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A method for neutralizing electrostatic charge comprising the steps of:
    placing a first conductive body in contact with a second conductive body, wherein the first conductive body is proximate to a charged object;
    inducing a positive charge on the first conductive body and an equal amount of negative charge on the second conductive body;
    electrically isolating the first and second conductive bodies;
    connecting the first conductive body to the negatively charged object long enough to neutralize excess positive charge;
    placing the second conductive body in contact with an electrical receiver;
    transferring excess charge into the electrical receiver;
    discharging and isolating the conductive bodies; and
    bringing the conductive bodies back into contact with each other.

2. The method of claim 1 wherein the electrical receiver receiving the excess charge is at least one rechargeable battery.

3. The method of claim 2 wherein the charged object proximate to the conductive body is a helicopter airframe.

4. The method of claim 3 wherein the conductive bodies in contact with each other are hollow metallic spheres.

5. The method of claim 4 wherein the steps of making and breaking electrical connections with the first and second conductive bodies are accomplished using a resistor-capacitor (RC) circuit.

6. The method of claim 5 further comprising the step of using an integrating ammeter to measure the charge on the conductive bodies.

7. The method of claim 4 wherein the steps of making and breaking electrical connections with the first and second conductive bodies are accomplished using a track on which the conductive bodies can move back and forth.

8. A system for neutralizing electrostatic charge comprising:
    a first conductive body in contact with a second conductive body, wherein the first conductive body is positioned within a hemispherical charging cup;
    a charged object electrically connected to the hemispherical charging cup;
    discharge electronics, wherein the discharge electronics are operatively coupled to a power source; and
    charge neutralization electronics.

9. The system of claim 8 wherein the first and second conductive bodies are hollow metallic spheres.

10. The system of claim 9 wherein the charged object is a helicopter airframe.

11. The system of claim 10 wherein the power source comprises at least one rechargeable battery.

12. The system of claim 11 wherein the system is housed in a Faraday shield enclosure.

13. The system of claim 12 wherein wide band gap devices are used to make and break connections.

14. The system of claim 13 wherein the wide band gap devices are Silicon Carbide Silicon Carbide Middle Oxide Semiconductor Field Effect Transistor (MOSFET) switches.

15. The system of claim 14 wherein the first sphere and second sphere are positioned on a track to allow for moving back and forth.

16. The system of claim 15 wherein the electrical connections are made using a resistor-capacitor (RC) circuit.

17. A method comprising the steps of:
positioning a first conductive body and a second conductive body along a track, wherein the first and second conductive bodies are in contact;
positioning the left side of the first conductive body within a hemispherical charging cup;
coupling the hemispherical charging cup with a negatively charged object;
moving the second conductive body to the right on the track until it makes contact with a metal conductor protruding from a discharge electronics module having an induced electrical charge;
transferring the induced electrical charge from the discharge electronics module to a power source;
moving a charge neutralization electronics module to contact the first conductive body and the hemispherical charging cup;
retracting the charge neutralization electronics module to break contact with the first conductive body and the hemispherical charging sphere.

18. The method of claim 17 wherein the negatively charged object to which the hemispherical charging cup is coupled is a helicopter airframe.

19. The method of claim 18 wherein the power source receiving the electrical charge is a rechargeable battery.

20. The method of claim 19, further comprising the step of using a Faraday shield enclosure to allow for an isolated reference ground plane.

* * * * *